United States Patent [19]

Hashimoto

[11] Patent Number: 4,829,556
[45] Date of Patent: May 9, 1989

[54] TELEPHONE ANSWERING DEVICE HAVING TELEPHONE ANSWERING AND CONVERSATION RECORDING MODES OF OPERATION

[75] Inventor: Kazuo Hashimoto, Tokyo, Japan
[73] Assignee: Hashimoto Corporation, Tokyo, Japan
[21] Appl. No.: 24,779
[22] Filed: Mar. 11, 1987
[51] Int. Cl.$^4$ .................................................. H04M 1/65
[52] U.S. Cl. .......................................... 379/79; 379/70
[58] Field of Search ............................ 379/70, 80–82, 379/68, 79

[56] References Cited

U.S. PATENT DOCUMENTS

| | | | |
|---|---|---|---|
| 3,979,560 | 9/1976 | Darwood | 379/82 |
| 4,011,411 | 3/1977 | Nishimura | 379/81 |
| 4,074,081 | 2/1978 | Humm | 379/82 |
| 4,514,593 | 4/1985 | Hattori et al. | 379/80 |

Primary Examiner—Alan Faber
Assistant Examiner—James E. Tomassini
Attorney, Agent, or Firm—Lowe, Price, LeBlanc, Becker & Shur

[57] ABSTRACT

An automatic telephone answering device having a conversation recording function has at least one tape cassette operative in a telephone answering mode to reproduce an outgoing message to a calling party and to record incoming messages in a standard manner, in response to an incoming call when the cassette is in a first position in the device. When the cassette is removed from the device, inverted reinserted so that the cassette is in a second position, the device is automatically operative in a conversation recording mode to record conversations between the calling and called parties. If more than a predetermined period of time elapses between the end of a conversation and the start of the next conversation or turning over of the cassette to provide a standby mode, an alarm is triggered.

2 Claims, 10 Drawing Sheets

SILENCE SECTION  OUTGOING MESSAGE PORTION  SILENCE SECTION

FIG. 2b

OUTGOING MESSAGE PORTION

FIG. 5

DIRECTION OF CONVERSATION REC. ← | → DIRECTION OF MESSAGE REC.
STANDBY POSITION

TELEPHONE ANSWERING DEVICE HAVING TELEPHONE ANSWERING AND CONVERSATION RECORDING MODES OF OPERATION

BACKGROUND OF THE INVENTION

The present invention relates to an automatic telephone answering device with conversation recording function.

In conventional automatic telephone answering devices having conversation recording function, a channel for recording messages received during the absence of a called party is the same as that for conversation recording. As a result, inconveniences occur for playing these message, and a tape is low in utilization efficiency, because the conversation recording is usually effected for a long period of time, whereas, in usual, the incoming messages received one after another during absence of called party are short in length, and hence, in the case of recording these messages in the same channel, recordable messages during absence are low in number if the tape has been almost utilized for conversation recording, and recordable time period for conversation recording becomes short after a number of messages have been recorded during the absence of the called party.

Accordingly, there have been problems which concern with utilization efficiency of tape, and ease of operation for playing and resetting.

SUMMARY OF THE INVENTION

The object of the present invention is to eliminate the above-mentioned problems in the prior art systems, and provide an automatic telephone answering device, which is arranged to automatically establish a state for conversation recording from the start point of a tape in the automatic telephone answering device, simply by turning over the tape to the other side, and is provided with means for generating an alarm when the tape comes to an end thereof or upon elapse of a predetermined time period from the instant the conversation recording is completed, so as to enable a user to remember to turn over the tape and establish a standby mode.

According to the present invention, an automatic telephone answering device with conversation recording function is provided.

The telephone answering device comprises: means for rewinding a tape up to its start position and then stopping same at that position when a cassette is turned over and set for performing conversation recording; means for performing conversation recording from the start position of the tape, said conversation recording means being operable to stop at a position at which the conversation recording has been completed to ready for subsequent conversation recording; means for generating an alarm if the conversation recording is not performed again within a predetermined period; and means operable to be set in an automatic answering mode when the tape is turned over and inserted again, and operable to save contents recorded until the time the tape is again turned over, and to be set in an automatic standby mode.

DETAILED DESCRIPTION

In the following, structures and functions of preferred embodiments of the present invention will be explained.

Figure 1:
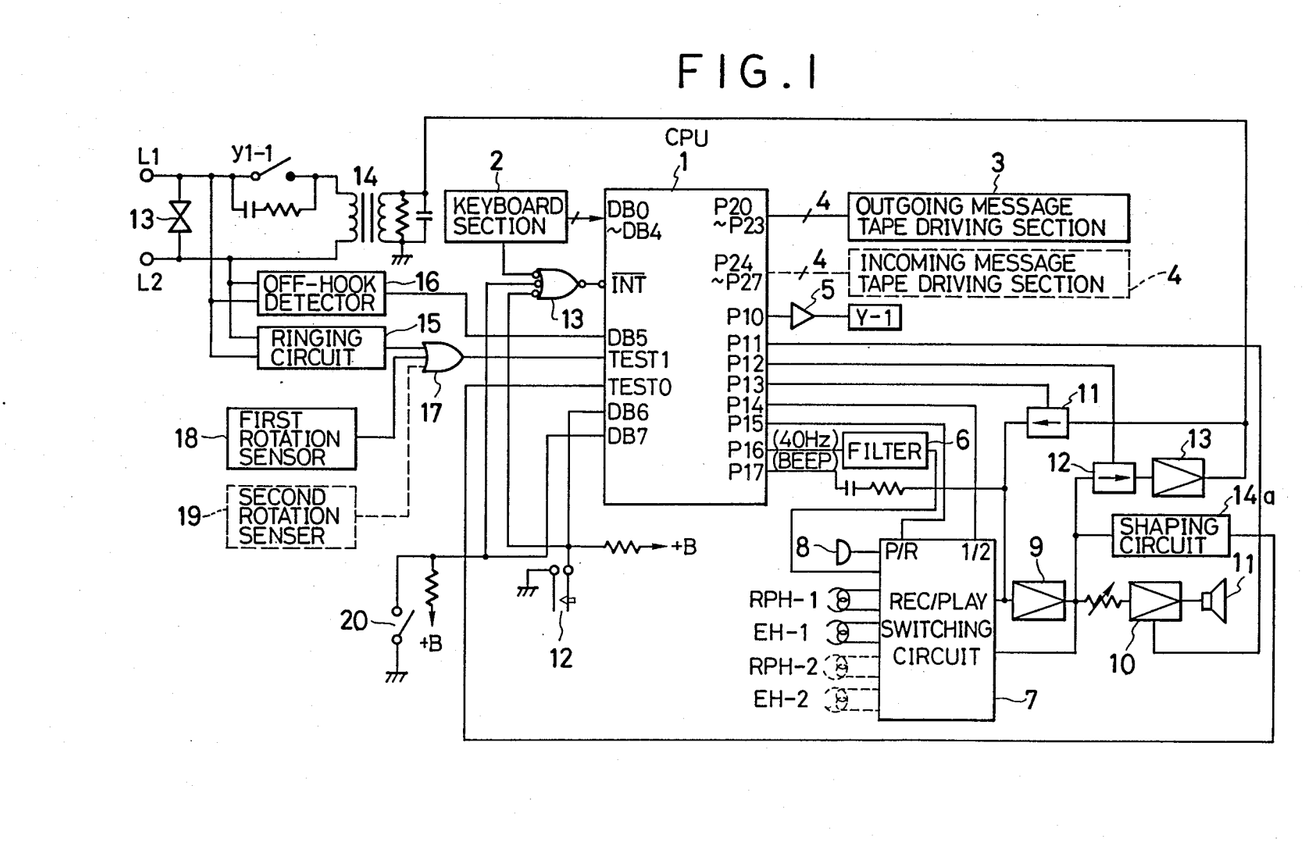
FIG. 1 is a circuit diagram showing a preferred embodiment.

In FIG. 1, reference numeral 1 denotes a microprocessor (hereinafter referred to as a CPU) which is composed of Intel 8049 in the present embodiment. The CPU has data buses DB0-DB6 as input terminals, ports P10-P16 and P20-P27 as output ports, a terminal $\overline{INT}$ as an interruption terminal, and terminals TEST0 and TEST1 as input terminals. Reference numeral 2 denotes a keyboard section which has a button for recording an outgoing message on an outgoing message tape T-1 (not shown), a button for setting the present telephone answering device in a standby mode for automatic answering/recording, buttons for rewinding and playing back an incoming message tape T-2 (not shown), etc. Further, reference numeral 3 designates a driving section for controlling rewind, normal wind, fast wind, stopping, etc. of the outgoing message tape T-1 in accordance with coded outputs supplied from the output ports P20-P23 of the CPU 1; 4 denotes a similar driving section for incoming message tape. Incidentally, in case that the telephone answering device requires only one recording tape on which both of the outgoing message and incoming messages from callers are recorded, either one of the driving section may be omitted. Reference numeral 5 denotes a driver; Y-1 a loop forming relay of telephone line, which has a contact y1-1; 6 a filter of 40 Hz, which is provided if the telephone answering device is of the above-mentioned single tape type, for converting a rectangular wave of 40 Hz prepared by program and supplied from the output port P16 into a sine wave which is then recorded in a manner superimposed on the outgoing message; and 7 a record/playback switching circuit which comprises analog switches and relays, in which H level and L level outputs appear at its P/R terminal for playback and record operations, respectively, and H level and L level outputs appear at its ½ terminal for actuating heads RPH-1 and EH-1 for answer, and heads RPH-1 and EH-2 for reception, respectively. In the meantime, in the single type, the heads RPH-1 and EH-1 are employed for both of answer and reception. Further, reference numeral 8 denotes a microphone for recording the outgoing message; 9 and 10 amplifier circuits; 11 and 12 analog switches controlled by the output ports P13 and P12; 13 an amplifier circuit for transmitting the outgoing message onto the telephone line with an appropriate level; and 14a a waveform shaping circuit provided in the telephone answering device of 1 cassette type, for outputting a rectangular wave of 40 Hz which is to be recorded in a manner superimposed on the outgoing message, and then supplied through the terminal TESTO and detected by the CPU 1 during rewind and fast wind operations. Further, reference numeral 12 denotes a cassette inversion detecting switch which is operated to close if the cassette is turned up and then inserted for conversation recording, with the input terminal DB6 of the CPU 1 set at L level which is supplied through an NOR gate 13 to enable the CPU 1 to be interrupted. Furthermore, reference numeral L1, L2 denote telephone lines; 13 a telephone set; 14 a line transformer; 15 a ringing circuit for detection of an incoming call signal; 16 an off-hook detecting circuit for detecting an off-hook state of the telephone lines; 17 an OR gate; and 18 a first rotation sensor which detects pulses supplied from a rotary section which is operatively coupled to a tape reel, for detection of travel position of the outgoing message tape by the program. Reference numeral 19 denotes a second rotation sensor for incoming message tape, which sensor may be omitted in the case that the telephone answering device is of 1 cassette type. Further, reference numeral 20 is an eject switch operatively coupled to an eject knob (not shown), and operable to be closed, so that the tape is stopped by program, not shown, when the tape is taken out.

The operation of the present telephone answering device constructed by the above-mentioned parts will be explained with reference to drawings and flowcharts of FIG. 2, et seq.

Figure 2A:
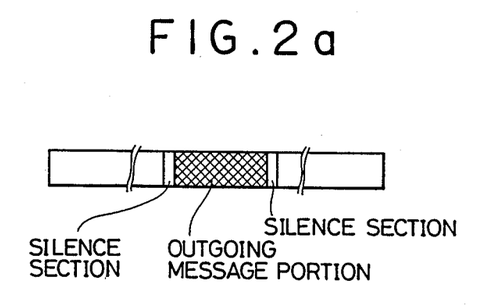
FIGS. 2(a) and 2(b) are views showing a location of an outgoing message portion on a tape.
Figure 2B:
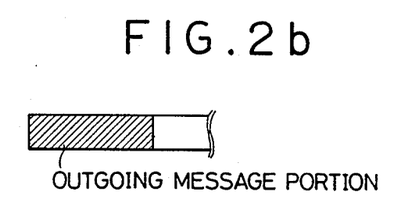

In this embodiment, the outgoing message is recorded on a middle portion of the cassette tape, as shown in FIG. 2a, so as to shorten an access time for switching to conversation recording mode mentioned later. Alternatively, as shown in FIG. 2b, the outgoing message may be recorded on the start point side of the tape and followed by incoming messages which are recorded one after another on the tape. In the following, explanations will be given as to the case relating to a recording manner shown in FIG. 2a alone. A manner of recording shown in FIG. 2b was disclosed in Japanese Patent Publication No. 61-24855, for instance, and thus an application of the present invention where the recording manner of FIG. 2b is adopted will be apparent from the disclosure in the above-mentioned Japanese Patent Publication and the following explanations.

Figure 3A:
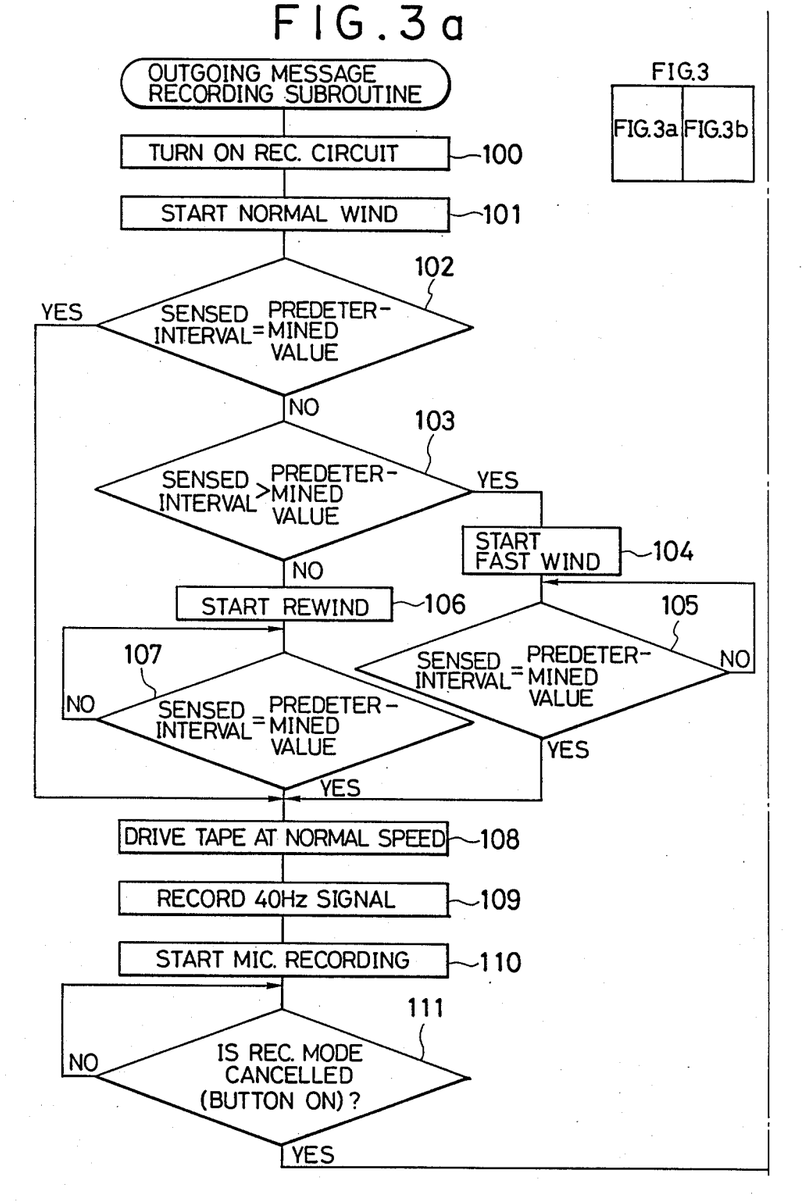
FIGS. 3(a) and 3(b) are flowcharts showing a process for recording an outgoing message onto a tape of 1 cassette type.
Figure 3B:
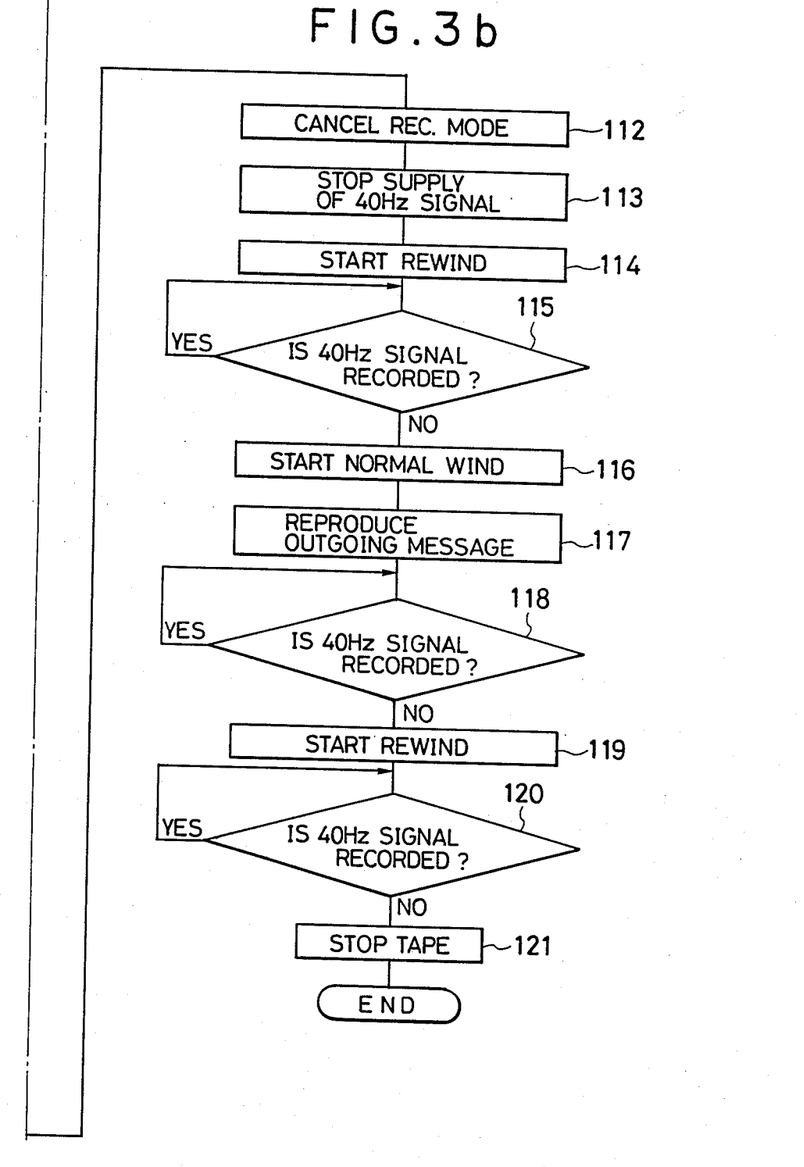

The flowchart of FIG. 3 illustrates recording process of the outgoing message in the 1 cassette type device wherein the outgoing message and incoming messages from callers are continuously recorded in a single cassette tape. In this connection, at first, the CPU 1 is enabled for interruption through the OR gate 13 and the interruption terminal INT, upon depression of a recording button (not shown) of the keyboard section 2 in FIG. 1, to advance the flowchart to the step 100 of FIG. 3. In this step, the output ports P14 and P15 are set at H and L levels, respectively, which are respectively applied to the ¼ and R/P terminals of the record/playback switching circuit 7 for rendering the record/playback head RPH-1 and the erasure head EH-1 actuated for recording. Next, in the step 101, the outgoing message tape driving section 3 is operated through the output ports P20-P24, so as to drive the cassette tape at its normal speed. In the subsequent step 102, after the start of tape, the interval of pulses generated from the rotary section coupled to the reel is measured by program. If the period of the thus measured pulse interval is equal to a predetermined value (which is obtained by measurement or calculation of the pulse interval at the middle portion of the tape), the flowchart advances to the step 108 to initiate the recording of the outgoing message. If it is determined in the step 102 that the measured interval is inconsistent with the predetermined value, the flowchart advances to the step 103. If the period measured by the first rotation sensor 18 is greater than the predetermined value, the current position of the tape is located at the side near its start position, and thus, in the step 104, the tape is subjected to fast wind toward the middle portion thereof. On the contrary, if the measured period is less than the predetermined value, which indicates that the tape is at the side of its end, the tape is rewound toward its middle portion in the step 106. In each of the steps 105 and 107, a test is made as to whether the period measured by the first rotation sensor is equal to a corresponding one of predetermined values actually measured or calculated beforehand for rewind and fast wind, which are different in magnitude from each other and from that of normal wind in the step 102. In either case, if the tape has reached the middle portion, switching to the normal speed is effected in the step 108, and the rectangular wave of 40 Hz is supplied from the output port P16 in the step 109, to be converted into the sine wave by the filter 6, and then recorded together with the outgoing message supplied from the microphone 8 in the step 110, as shown in FIG. 2a. Accordingly, in a tape portion on which the outgoing message is recorded, a continuous signal is detected even if the outgoing message is temporarily terminated. This guarantees an easy discrimination between the outgoing message and incoming messages from callers. In addition, silence sections may be formed at the opposite ends of the outgoing message. Upon depression of a recording stop button (not shown) after the outgoing message has been recorded completely, the flowchart advances from the step 111 to the step 112 to cancel recording mode and to stop the generation of the 40 Hz output (the step 113). Thereafter, the tape is rewound and played back to confirm the contents of the outgoing message, and hence is rewound up to its start position, to be stopped at that position (the steps 114-121).

Figure 5:
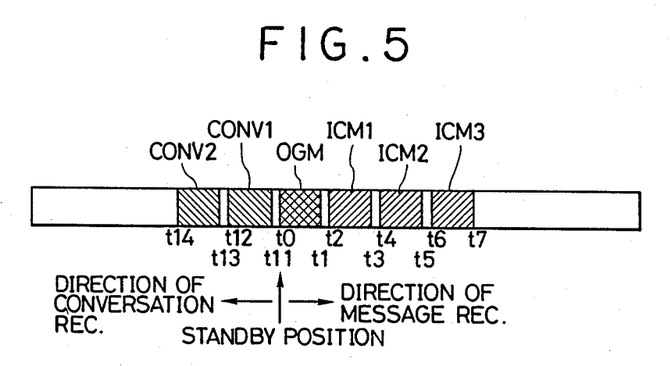
FIG. 5 is a view showing a distribution of recorded messages in the 1 cassette type of tape.

In order to set the device in the standby mode for automatic answering/recording after the outgoing message has been recorded in the above-mentioned manner, a predetermined button (so-called "AUTO" button) in the keyboard section 2 of FIG. 1 is depressed. Upon reception of an incoming call, the outgoing message corresponding to a portion defined between t0-t1 in FIG. 5 is transmitted, and an incoming message (ICM1 defined between t2-t3 in FIG. 5) sent from the caller for the first time is recorded at a tape location following the outgoing message. After completion of recording of the message of ICM1, the tape is rewound up to the point t0, to set the device in the standby mode. Upon reception of a subsequent incoming call, the OGM between t0-t1 is transmitted, and the tape is subjected to fast wind up to t3, and an incoming message (ICM2) from the caller is recorded on a section between t4 and t5.

Figures 4, 4A:
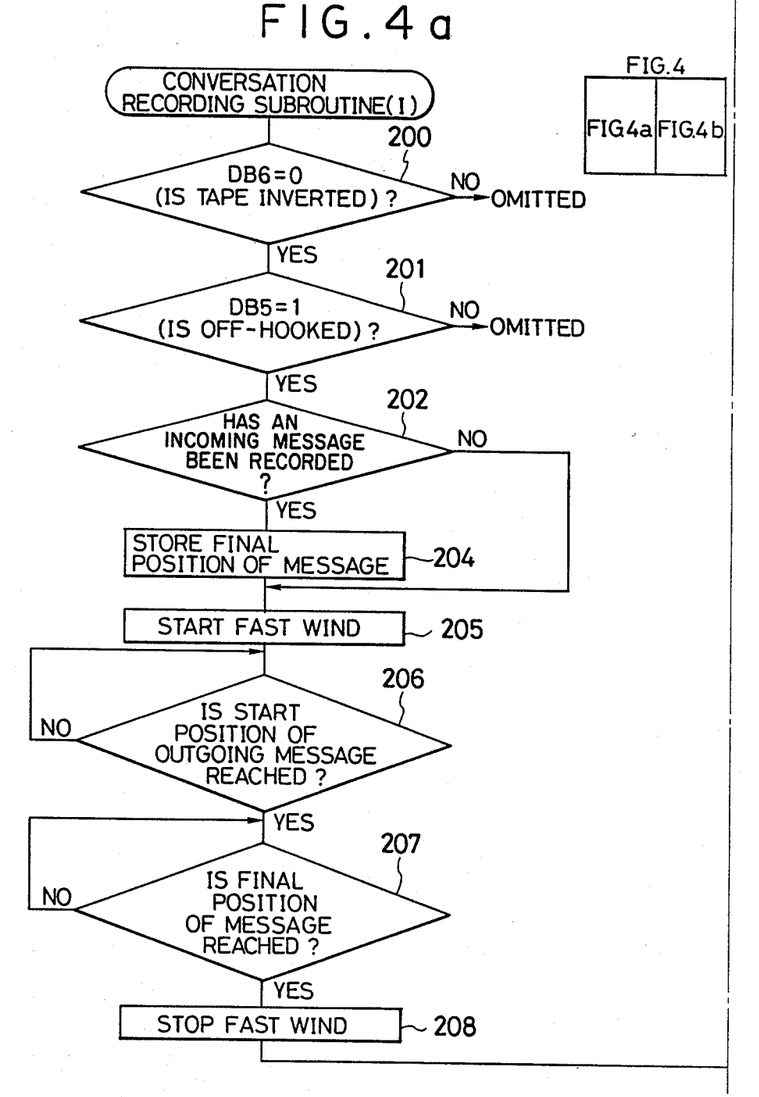
FIGS. 4(a) and 4(b) are flowcharts for conversation recording onto a tape of 1 cassette type.
Figure 4B:
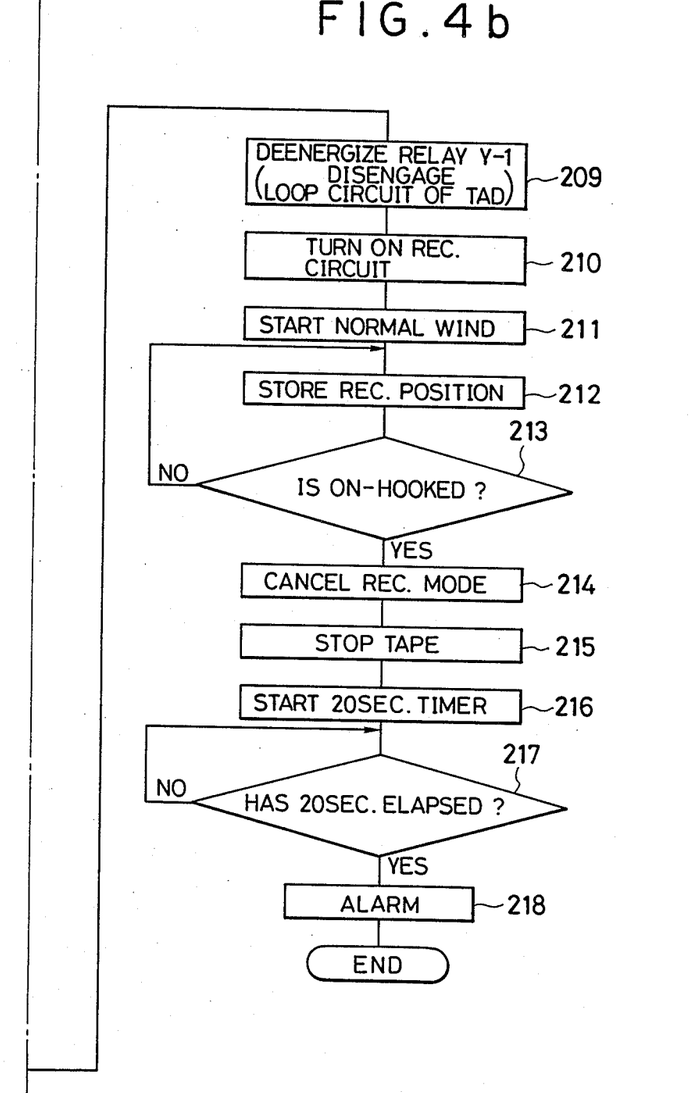

The flowchart of FIGS. 4(a) and 4(b) illustrates a process for conversation recording which may be made during transmission of the outgoing message or during recording of an incoming message from a caller, where required.

Figures 7, 7A:
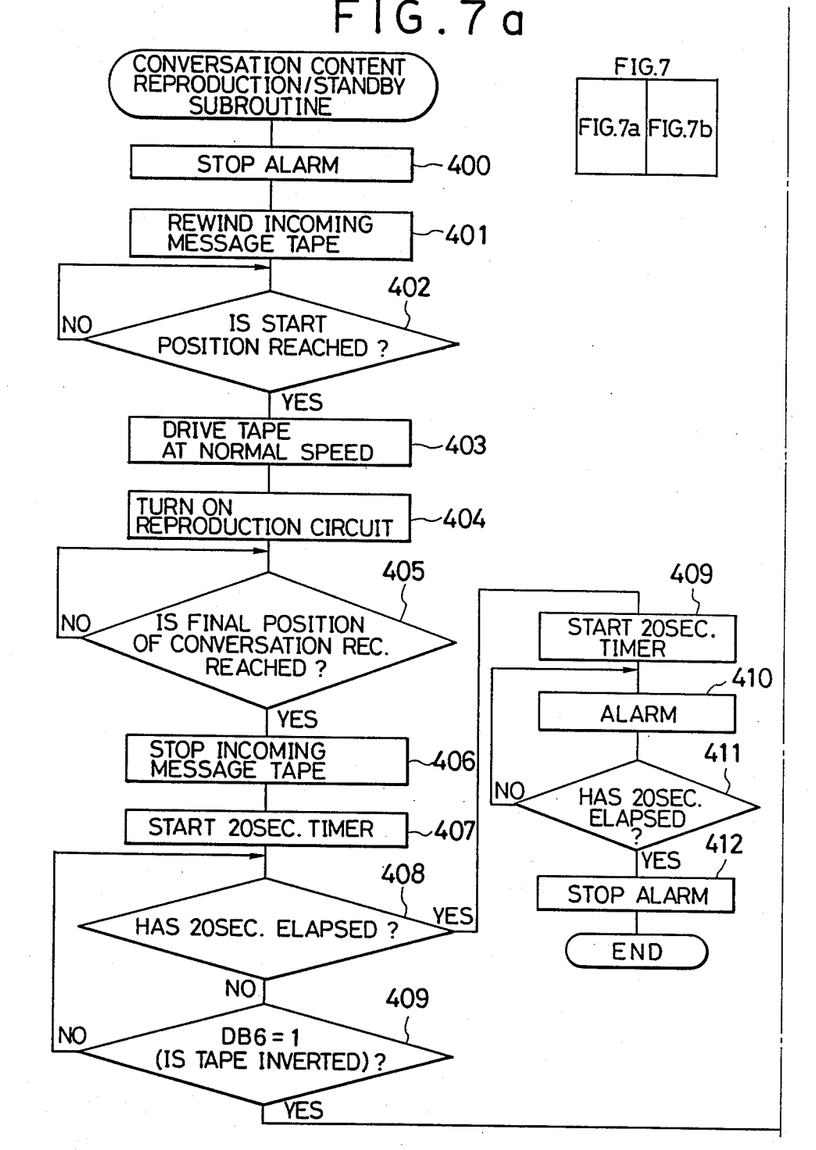
FIGS. 7(a) and 7(b) are flowcharts showing operations from an operation of playing back an incoming message tape to an operation of setting same in a standby mode.
Figure 7B:
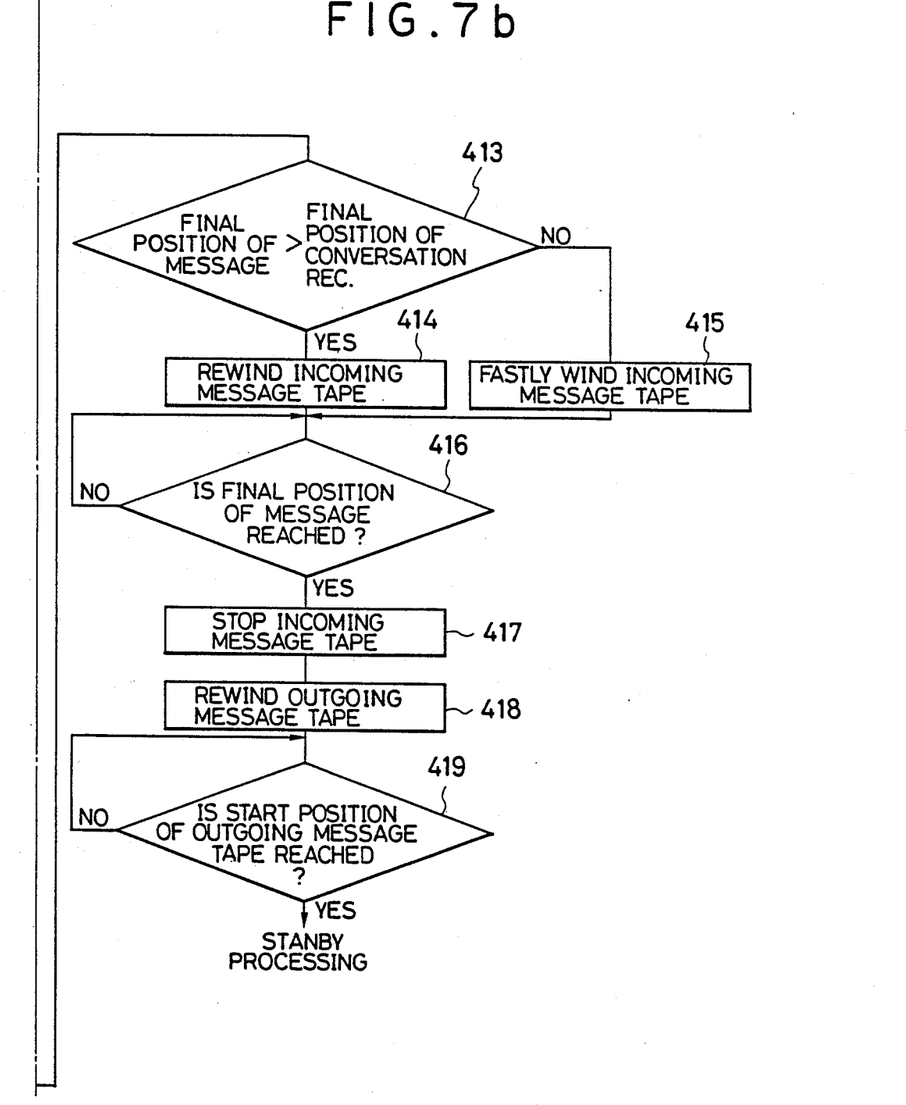

In order to perform conversation recording, the cassette is to be turned over and inserted. In the present embodiment, a lug (well known but not employed in a standard automatic telephone answering/recording device) for preventing recording and provided at the conversation recording side is cut off. A notched portion of this lug causes the cassette inversion detecting switch 12 to close, so as to generate an interruption request which is supplied via the OR gate 13 and to set the terminal DB6 at L level, to advance the fowchart from the step 200 to the step 201, where a detection is made as to whether an off-hook state of the telephone set 13 or that of the present automatic answering-/recording device is established by the use of the off-hook detecting circuit 16. If the off-hook state is detected, the flowchart advances to the step 202 to test whether an incoming message is being recorded. If so, the final position of the incoming message is recorded in a memory (RAM) of the CPU 1 at the subsequent step 204. In the example of FIG. 5, the final position corresponds to the position of t7. Thereafter, the tape is subjected to fast wind up to the start position of the outgoing message (the steps 205, 206). Since he cassette has been turned over, the fast winding rather than the rewinding should be effected from the position at t7 of FIG. 5 to the position at t0. The position t0 is determined as a location at which a continuous sound of 40 Hz during the fast winding is disappeared. Alternatively, the position t0 may be determined in accordance with a number of counts counted by the first rotation sensor 18. In the subsequent step 207, a determination is made as to whether a final position of conversation recording has been reached. Since the position for an initial conversation recording is located at t11 adjacent to the start position t0 of the outgoing message (OGM), the fast winding is terminated upon detection of such position (the step 208), and then the relay Y-1 is rendered off to disengage the loop circuit of the telephone answering device. Of course, the telephone set 13 is off-hooked prior to the off position of the relay Y-1. Thereafter, the recording mode is established (the step 210), and the tape is started to be driven at a normal speed (the step 211). Under these conditions, conversation between the calling and called parties will be recorded until when a detection of on-hook of the telephone set 13 is made at the step 213, and the recording position in the tape is recorded at the step 212. In the initial conversation recording (CONV1), the position at t12 is recorded as final position in a memory of the CPU1. This recording mode is cancelled when the above-mentioned on-hook operation is effected, and then the tape is stopped (the steps 214 and 215). In the step 216, a timer of 20 seconds, for instance, is started to generate upon elapse of 20 seconds (the steps 217 and 218). The above is provided as a countermeasure to remember the user to turn up the tape because the automatic answering/recording mode as a primary intended function of the device will not be achieved if such tape turning-over operation is forgotten. In the meantime, as shown in the flowcharts of FIGS. 7 and 8, no alarm may be generated during operations of rewinding and playing back the tape for listening to contents recorded in the conversation recording, whereas the alarm may be generated if no tape turning-over operation is performed even after the tape is stopped. Further, the alarm may be generated in a condition that the tape has come to an end thereof, where a constant output is generated from the first rotation sensor and the recording position to be recorded in the step 212 is kept unchanged.

Figure 6A:
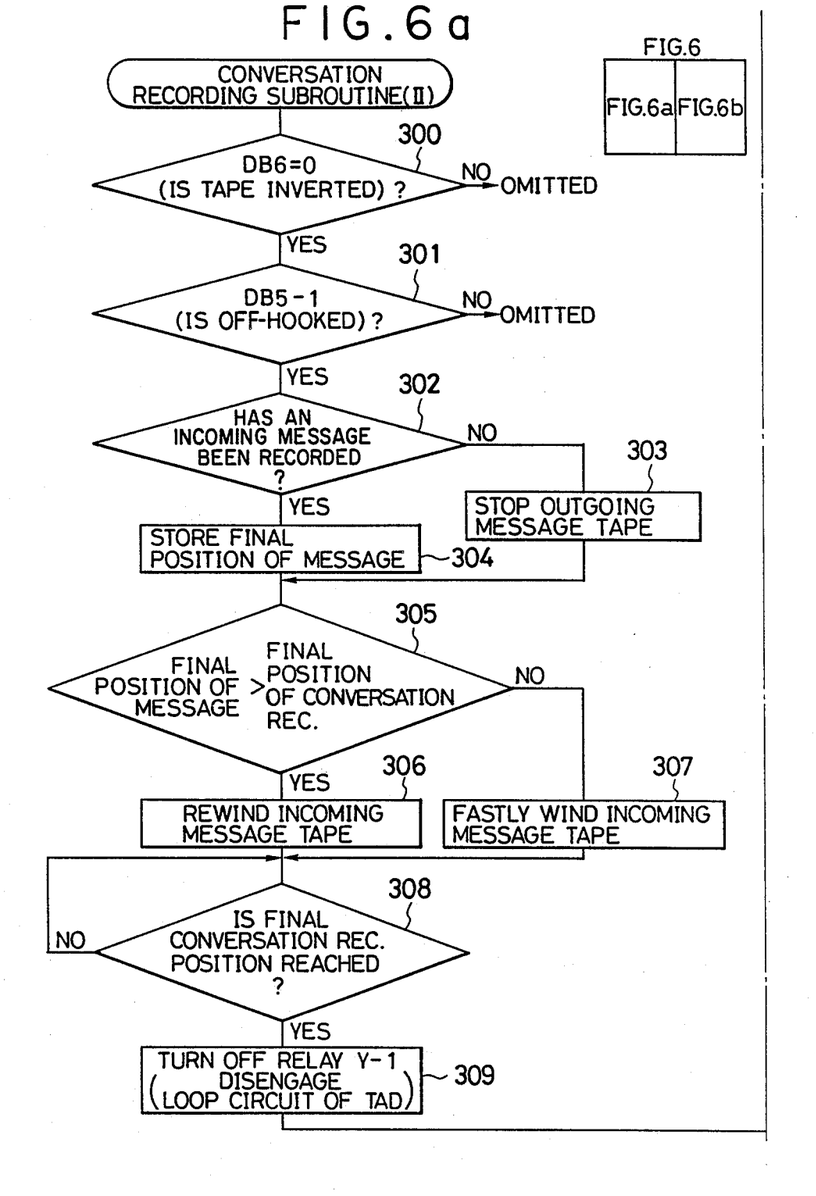
FIGS. 6(a) and 6(b) are flowcharts for conversation recording onto an incoming message tape of the device of 2 cassette type.
Figure 6B:
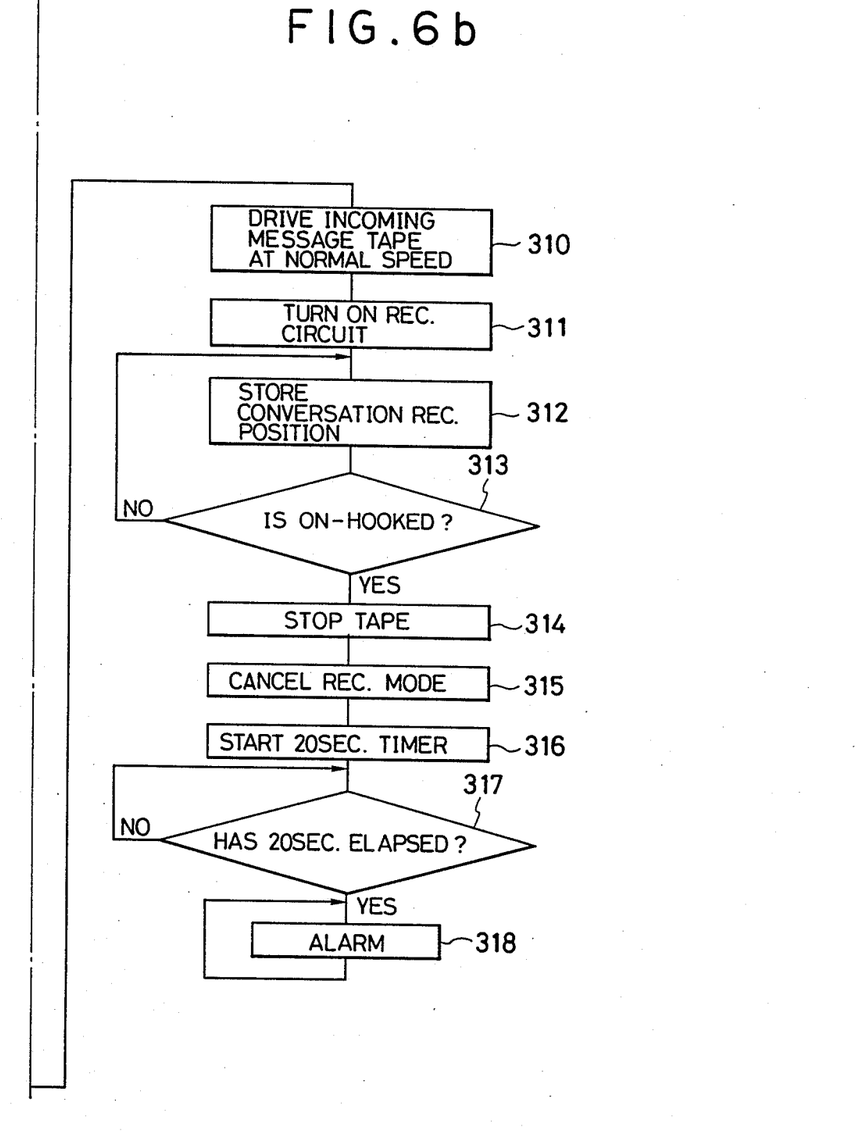

In the following, the flowcharts of FIGS. 6 and 7 showing a second embodiment will be now explained. This embodiment is applicable to a device of the type using two independent cassette tapes for outgoing and incoming messages. By the way, portions of this embodiment which are in common to the above-mentioned embodiment will be explained in a simplified manner. As in the above-mentioned 1 cassette type, an interruption request is generated when the cassette for incoming message is turned over and then inserted for conversation recording during the automatic answering or recording operation of the telephone answering device. As a result, the program advances to the step 300 of FIG. 6, where a determination is made as to whether the input terminal DB6 of the CPU 1 is at its L level. If so, the program advances to the step 301 where the telephone lines L1 and L2 are in an off-hook state, and then to the step 302 to test whether an incoming message from a caller has been recorded. If the outgoing message is being transmitted, the outgoing message tape is stopped (the step 303). If the incoming message tape is in its recording mode, where the cassette has been turned over and inserted as mentioned above, the final recording position is recorded in the memory of the CPU 1. To be noted, if the automatic answering is being effected, the final recording position is recorded in the memory upon restration of the telephone answering device. In the subsequent step 305, a determination is made as to whether the tape should be rewound or fast wound for setting the tape at its start position to effect the conversation recording of present time, such determination being made in accordance with a relationship between final position of the incoming message and that of the previous conversation recording. For instance, if the two incoming messages have been recorded in the incoming message tape and the conversation recording will be effected for the first time, the rewinding of the incoming message tape is started at the step 306. In the subsequent step 308, a test is made as to whether the tape has been rewound (or fast wound) to the final position of conversation recording which is stored in the memory of the CPU 1. If so, the DC coupling at the telephone answering device side is disengaged (the step 309), and the tape is driven at a normal speed in the recording mode so that conversation between the both parties is started to be recorded at the inverted side of the incoming message tape (the steps 310 and 311). This conversation recording is continued until when the telephone set 13 is on-hooked, and the position of conversation recording is recorded in the memory of the CPU 1 during the recording to set the tape at its start position for the subsequent conversation recording (the steps 312 and 313). Further, upon on-hook of the telephone set, the tape is stopped and the recording mode is cancelled, and an alarm is generated upon elapse of 20 seconds if the cassette is not turned over again to ready for the automatic answering/recording mode (the steps 314-318).

The flowchart of FIG. 7 illustrates operations from an operation of listening to contents of conversation recording recorded in accordance with the flowchart of FIG. 6, to an operation of setting the device in the standby mode by turning over and inserting the tape after the listening operation. In order to listen to the contents of the conversation recording, at first, the user depresses a rewinding button of the keyboard section 2 in FIG. 1. Upon depression of the button, an interrupt request is generated to advance the program to the step

400, wherein the generation of the alarm is cancelled. Thereafter, the incoming message tape is started to be driven until the tape is rewound at the start position of the conversation recording to be listened to, and then the tape is driven at the normal speed and recorded contents are amplified by the speaker 11 (the steps 401-404). Just when this reproduction has been carried out up to the final position of the conversation recording, the incoming message tape is automatically stopped and the 20 second timer is started (the steps 405-407). Before the elapse of 20 seconds, a test is made as to whether the terminal DB6 of the CPU 1 has been restored to H level so as to test whether the cassette has been turned up again and set in its original condition (the steps 408 and 409). If the tape is not turned over and kept as it was, an alarm is generated upon elapse of 20 seconds, the alarm continuing for 20 seconds (the steps 409-412). If the cassette is turned over and inserted, the program advances from the step 409 to the step 413. As in the step 305 of FIG. 6, the rewinding or fast winding for setting the tape at the start position of incoming message is effected (the steps 413-415), and the tape is stopped at that position (the steps 416 and 417), and, if required, the outgoing message tape is also set in its start point (the steps 418 and 419), and hence the standby mode is established. Namely, the device is automatically restored in the standby mode only by turning over the cassette, without the need of depressing an operation button.

As mentioned above, the present invention is designed to automatically set a tape at its start position upon inversion of the tape, so as to permit automatic conversation recording from the start position of the tape, in view of inconveniences in the prior automatic telephone answering device where conversation recording and incoming messages received by a reception means of the device are recorded in a single channel or a single tape. Further, the present invention is practically advantageous in that an alarm is generated when a predetermined period of time has elapsed from the instant the conversation recording is completed or when the tape has come to its end so that the user is allowed to remember to turn over the tape so as to set the telephone ansering device in its automatic answering mode.

What is claimed is:

1. An automatic telephone answering device connectable to telephone lines and operable selectively in telephone answering and conversation recording modes and having at least one recording tape cassette and means for driving said tape cassette, said device comprising:

means for detecting whether said cassette tape is inserted into said device in a first position with one side of said cassette up or in a second, inverted position with the opposite side of said cassette up;

first means responsive to said detecting means for operating said device in said telephone answering mode when said cassette tape is in said first position, said telephone answering mode operating means including means for establishing a closed loop of the telephone lines upon reception of an incoming telephone call, means for transmitting on the telephone lines a prerecorded outgoing message to a caller and means for recording an incoming message from the caller;

second means responsive to said detecting means for operating said device in said conversation recording mode when said cassette is in said second, inverted position, said conversation recording mode setting means including means for detecting a start position on said tape cassette, means for rewinding said tape cassette to said start position, means for driving said cassette tape while recording onto said cassette tape, beginning at said start position thereof, a conversation between said caller and a called party, means for detecting the completion of the conversation and, in response, stopping said tape cassette, means for establishing a predetermined time period from the time of said conversation recording completion, and means for generating an alarm if another conversation is not recorded on said cassette tape within said predetermined time period; and third means responsive to said detecting means for setting said device in said automatic answering mode when said cassette tape in said second position is removed from said device with recorded contents stored therein, inverted to have said first position and reinserted into said device, said third means including means for setting said device into an automatic standby condition within said telephone answering device, ready to operate said device in said automatic answering mode in response to a next incoming call.

2. The device of claim 1, including means for detecting that said tape cassette is set at or near an end thereof and, in response, preventing said cassette driving means from starting, and controlling said alarm generating means to generate said alarm.

* * * * *